Figure 1:
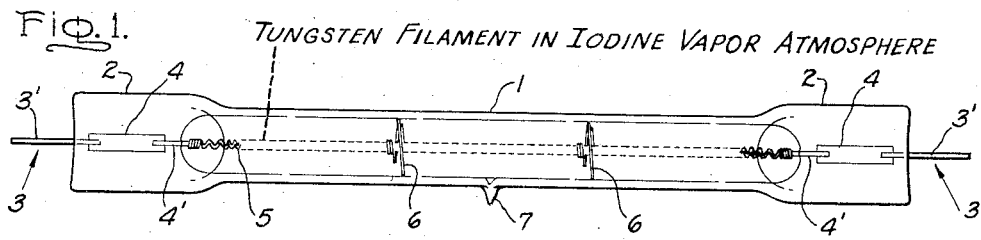

April 21, 1959  E. G. FRIDRICH ET AL  2,883,571

ELECTRIC INCANDESCENT LAMP

Filed March 3, 1958

Inventors:
Elmer G. Fridrich,
Emmett H. Wiley,
by Otto Tichy
Their Attorney.

United States Patent Office 2,883,571
Patented Apr. 21, 1959

2,883,571

ELECTRIC INCANDESCENT LAMP

Elmer G. Fridrich and Emmett H. Wiley, Cleveland, Ohio, assignors to General Electric Company, a corporation of New York Application March 3, 1958, Serial No. 718,711

6 Claims. (Cl. 313—179)

This invention relates to incandescent electric lamps generally, and more particularly to an incandescent lamp having a high luminous efficiency for a long useful life.

The efficiency of a filament is a function of its temperature and it increases very rapidly with increasing temperature. For this reason it is a constant aim to reach high filament temperatures. However, there is a practical limit to the temperature at which the filament may be operated and still have a reasonable life. The incandescent filament sublimes or volatilizes to form a dark deposit on the bulb which decreases the output of light, and the size of the filament decreases eventually to the breaking point. As a result, the design life of an incandescent lamp is a compromise between efficiency and life to give the maximum amount of light per unit of cost including the cost of the lamp itself as well as the power consumed thereby throughout its life.

In order to minimize the effect of bulb blackening on light output, it has been the practice to employ a bulb of comparatively large size so as to distribute the blackening over a large area and thereby minimize its effect. It has also been the practice to employ a gas filling such as nitrogen or argon to minimize volatilization of the filament. It has been proposed to still further minimize filament vaporization by employing heavy gases or vapors, such as krypton, xenon or mercury vapor, and by increasing the pressure of the gaseous filling in excess of an atmosphere or even several atmospheres. While such techniques provide a certain degree of improvement, they entail a substantial increase in cost and the high pressures involve dangers of explosion.

It is an object of our invention to provide a new and improved incandescent electric lamp having high efficiency, preferably in excess of about 20 lumens per watt, and better maintenance, that is, greater efficiency at stated life than that provided by present incandescent lamps.

It is another object of our invention to provide a new and improved high intensity incandescent electric lamp having high luminous efficiency and especially adapted for uses such as projection illumination.

It is a further object of our invention to provide a new and improved incandescent lamp of compact physical size and having greater luminous efficiency and better maintenance than lamps presently available.

We have found, in accordance with the present invention, that high efficiency for a long useful life can be attained by departing from the conventional concepts of comparatively large bulb size for a given energy dissipation, and deliberately employing a small compact bulb containing an atmosphere of iodine vapor. The iodine functions as a regenerative getter in association with the tungsten filament by combining with evaporated metallic tungsten at the bulb wall to form tungsten iodide which migrates to the vicinity of the hot tungsten filament where it is dissociated and the tungsten is returned to the filament. We have found that the small compact bulb size with high energy loading is necessary to maintain a comparatively short path for travel of the iodine vapors from the filament to the bulb wall to thereby minimize the chances for re-combination of the dissociated iodine before it reaches the bulb wall, and to also maintain the bulb wall at a temperature above a critical value necessary to effect the reaction of the iodine with the vaporized tungsten particles. On the other hand, the absence of iodine from a lamp proportioned in accordance with our invention results in a complete blackening of the envelope in a matter of minutes, for instance about 10 minutes, as compared with operation for a life of hundreds of hours, or even in excess of 2,000 hours, with a remarkable degree of freedom from blackening.

Although the use of halogens, including iodine, has been proposed heretofore, to our knowledge iodine-containing lamps have not heretofore been commercially successful in the manner contemplated by the present invention. This may have been due to failure to appreciate the need for certain critical conditions hereinbefore and hereinafter pointed out.

Generally speaking, the necessary operating conditions and optimum results are secured by employing a concentrated filament, for instance of helically coiled or coiled coil configuration, in a small substantially tubular envelope wherein the filament extends along the envelope axis and virtually the full length thereof so that the distance from the filament to the bulb wall is not excessive and the necessary bulb wall temperature is achieved. The minimum bulb wall distance (from the filament) is determined only by physical considerations of providing for reception of the filament with sufficient spacing to avoid contact between the filament and the bulb wall and without heating the bulb wall to an excessive temperature which would adversely affect the cyclic reaction of the iodine vapor. Thus, the bulb diameter may vary from approximately .080 inch to approximately 1½ inches depending upon the concentration of, and energy loading in, the filament. Our work has indicated that in order for the iodine to properly perform its function the inside bulb wall temperature should be maintained at a minimum of approximately 250° C. and a maximum of about 1200° C., to assure, on the one hand, that the reaction of tungsten with iodine to form tungsten iodide proceeds at the proper rate and, on the other hand, to avoid dissociation of tungsten iodide at the bulb wall. The bulb is preferably composed of quartz or other essentially fused silica composition such as the product known as Vycor which contains about 96% silica.

The lower limit of iodine content to assure functioning of the regenerative process at the proper rate is somewhat difficult to determine; however, our experience indicates that it should amount to at least about .01 micromole per cubic centimeter of bulb volume. On the other hand, the upper limit of iodine content should not exceed that amount which results in appreciable absorption of light by the iodine vapor in the bulb. We have found that the iodine vapor pressure should generally not be greater than about 5 mm. of Hg. While light absorption by the iodine vapor is related to bulb size, or depth of the iodine layer, our experience indicates that, in general, the iodine content should not exceed approximately 1 micromole per cc. of the bulb volume.

In very small tubular bulbs operated in a vertical position and having a bulb diameter and argon gas pressure such that the bulb diameter is within the Langmuir sheath (i.e. a stationary gas layer around the filament), there may in some cases be thermal separation of the iodine and argon with concentration of iodine at the bottom of the bulb; however, there is usually sufficient iodine at the top of the bulb to carry out the regenerative gettering process so long as the bulb walls are maintained at proper temperature. However, to assure the presence of sufficient iodine in all parts of the bulb, it may be made of sufficiently large diameter to assure the presence of turbulent convection currents whereby the iodine is swept up and carried to all parts of the bulb.

The halogens other than iodine have been found to be unsatisfactory for the purposes of the present invention due mainly to excessive reactivity. Chlorine, for example, causes disintegration of the filament supports and the growth of "spikes" on the filament near its ends and adjacent the intermediate filament supports where such supports are employed. Bromine is only slightly less destructive, while fluorine is not at all suitable.

Substantial further improvements in life are obtained by employing a gaseous filling such as argon, krypton or xenon, or mixture thereof, at a substantial pressure, for example argon at a pressure of several hundred millimeters Hg., preferably about 600 mm. The gas filling not only retards vaporization of the tungsten filament but apparently causes a more uniform deposition of tungsten back upon the filament.

However, it has been found that mercury vapor in the lamp causes blackening. Furthermore, the presence of nitrogen in highly loaded tubular lamps of small size, about ½ inch diameter and less, has been found to cause blackening of the envelope.

We have obtained good results with lamps having tubular bulbs and coiled tungsten filaments extending virtually the full length of the bulb and operated at a loading in excess of 100 watts per inch of length, and a bulb wall loading of approximately 24 watts per square centimeter of internal bulb surface. However, we have also employed designs in which the bulb wall loading ranged from 8 to 75 watts per square centimeter. The filament temperature may be approximately 2500° C. or higher. Under these condiitons, lamps of 500 watt capacity may be operated at an initial efficiency of up to about 30% higher, for the same life of about 1,000 hours, as compared with conventional 500 watt lamps; the efficiency throughout life is even higher because of the improved freedom from blackening. On the other hand, our improved lamp, when operated at the same initial efficiency as conventional lamps, has a life 30% greater or more, with a maintenance of some 98% as compared to about 85% maintenance at 700 hours of burning for the conventional lamp. (It will be understood that maintenance is the ratio of light output at the stated interval of life to the initial light output.) While our lamps may be designed for operation at efficiencies in excess of 20 lumens per watt for a life in excess of 2,000 hours, for certain applications, such as projection lamps, they may be designed to operate at efficiencies of some 35 lumens per watt for a useful life of some 10 to 15 hours.

It is also important that the tungsten filament be of high purity. To that end, the presence of iron should be avoided in the processing of the filament which is usually wound around a steel mandrel and annealed at elevated temperatures. Diffusion of iron from the mandrel onto the filament should be avoided by proper control of the annealing temperature. Iron present in or on the filament is evaporated during lamp operation and forms a deposit on the bulb wall which combines with the iodine to form iron iodide, which is quite stable in the solid state, and thereby destroys the regenerative cycle. This effect is particularly aggravated if there should be a relatively cool spot on the bulb in which the iron can deposit and then tie up the iodine. It is therefore highly beneficial to maintain a substantially uniform temperature throughout the bulb and within the stated range of 250–1200° C. To that end, it may be desirable in some cases to provide heat retaining means, such as a coating of platinum paint, on normally cooler parts such as the ends of the bulb.

It is also important to have a uniform filament temperature to insure an even or uniform deposition of tungsten on the filament. To that end, it is desirable to minimize the number of supports and any other factors which would tend to produce relatively cool zones on which the tungsten would deposit selectively. This comes about when the tungsten iodide formed at the bulb wall migrates toward the filament and is decomposed, the tungsten settling on the filament and the iodine being released to recombine with other tungsten at the bulb wall. The decomposition occurs at some distance from the filament dependent upon the filament temperature which must be above about 1400° C. to effect the decomposition. In case there is a relatively cool spot on the filament, the tungsten iodide approaches more closely before being decomposed, with the result that it builds up on the cool spots to the exclusion of hotter spots from which tungsten continues to be vaporized until the filament is eventually burned through.

Another important consideration is that the lead-in wires and other supports, if any, for the filament, be composed of a metal or alloy which is not readily attacked by the iodine. Thus, the commonly employed metals such as copper, nickel or iron are not suitable. Satisfactory results are obtained with metals like molybdenum, tungsten and platinum. We presently prefer to make those portions of the lead wires extending into the interior of the lamp of tungsten; in some cases lead wires of molybdenum are heated to a sufficiently high temperature to result in formation of molybdenum iodide which is deposited on the bulb wall, resulting in depletion of the iodine. However, the temperature of the lead wire may lowered by, for example, covering it with an overwind of tungsten wire.

Figure 2:
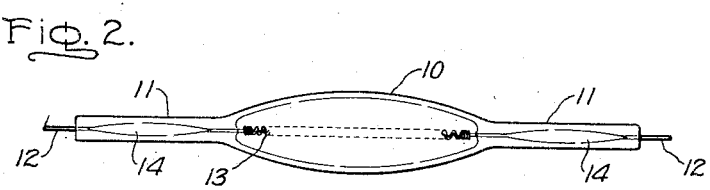

For a further understanding of our invention reference may be had to the following description taken in connection with the accompanying drawing and its scope will be pointed out in the appended claims. Fig. 1 is an elevation of a lamp embodying our invention; Fig. 2 is an elevation of a lamp of modified configuration; and Fig. 3 is a graph of life vs. efficiency in lumens per watt of a nominally 500 watt iodine lamp of our invention compared with a standard commercial 500 watt lamp.

Referring to Fig. 1 of the drawing, the lamp illustrated therein comprises a tubular envelope 1, preferably of fused crystalline quartz, and about ½ or ⅜ inch diameter, having its ends compressed to form flattened press or seal portions 2 in which are hermetically sealed and embedded the lead-in conductors or wires 3. The conductors 3 may each consist of an outer section 3' of molybdenum wire, an inner section 4' of tungsten wire and an intermediate thin foil section 4 of molybdenum. A filament 5 of coiled tungsten wire extends axially of the bulb 1 and is connected at its ends to the inner end portions 4' of the lead wires 3; a few of the end turns of the filament coil being clamped around the said lead wires. The filament 5, if desired, may be supported intermediate its length by tungsten wire spirals 6. The bulb is evacuated and preferably filled with gas and with iodine vapor through an exhaust tube, a residue of which is shown at 7.

The following data is illustrative of a specific lamp of the type illustrated in Fig. 1 and designed for operation at a loading of 500 watts on a 120 volt energy source: an internal bulb or tube length of 82 mm. (about 3.2 inches), with over-all length to the ends of the seal portions 2 of 114 mm. A nominal bulb or tube diameter of ⅜ inch, more specifically about 10 mm. outside diameter and 8 mm. inside diameter, so that the bulb volume is approximately 4 cc. A filament coil length of 80 mm. composed of tungsten wire having a size corresponding to a weight of 96.9 to 102.9 milligrams per 200 mm. of length, coiled on a 30 mil mandrel at 96.9 turns per inch, resulting in a coil length of 77.3 mm. which is stretched slightly when mounted in the bulb. Approximately 2 mm. of the filament coil at each end is attached to the respective lead wire 3. The bulb contains a filling of argon at 600 mm. pressure and contains iodine in an amount between .05 and 5 micromoles, for instance about 1 micromole. Such a lamp may be operated at an efficiency of some 27 lumens per watt for a life of 1,000 hours.

Figure 3:
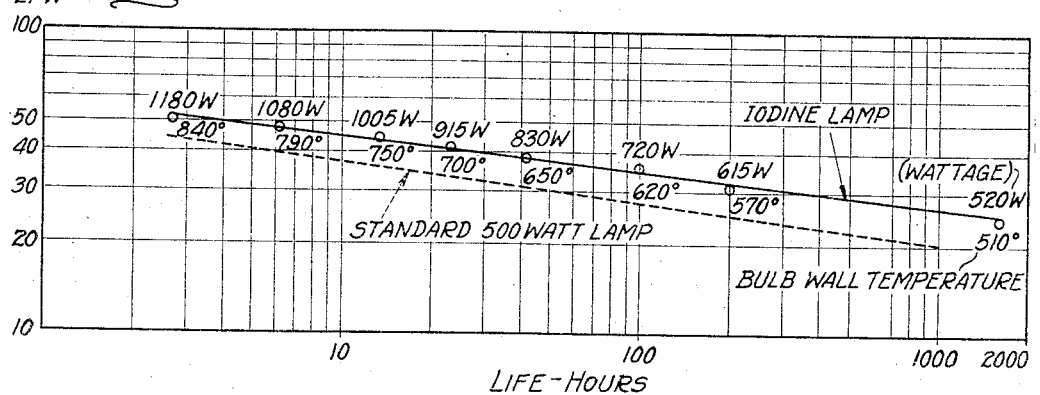

Fig. 3 is a graph, on a logarithmic scale, of life vs. efficiency of iodine lamps of the type described above in comparison with standard commercial 500 watt lamps, both operated at increasing voltage. It will be seen that the iodine lamp operating at an efficiency of about 24 lumens per watt has a life of about 1,600 hours as compared with the standard lamp operating at an efficiency of about 19 or 20 lumens per watt for a life of about 1,000 hours; when operated at the same efficiency of 24 lumens per watt, the standard lamp has a life of only about 250 hours compared with the 1,600 hour life of the iodine lamp.

The lamp illustrated in Fig. 2 comprises an ellipsoidal bulb 10 having seal portions 11 extending outwardly therefrom and in which are directly embedded the lead-in wires 12 of molybdenum having thin (.0005–.0010 inch) intermediate portions 14 and to the ends of which is connected the filament 13.

In a specific embodiment, the bulb 10 of a lamp of the type shown in Fig. 2 may have a length or major diameter of about 15/16 inch and a transverse or minor diameter of about 5/16 inch. The coiled filament 13 has a lighted length (i.e., distance between the inner ends of the leads 12) of 9/16 inch, the wire size, coil diameter and pitch being the same as that for the 500 watt lamp described above. The bulb also contains a filling of argon gas and iodine vapor in accordance with the invention, and is operated at a loading of 100 watts from a 28 volt source. In another embodiment the bulb 10 had an inside length of slightly less than 1/4 inch and a transverse inside diameter of about 1/8 inch, and was operated at a loading of 25 watts from a 6 volt source.

When desired, the lamps are mounted in an outer bulb similar to ordinary incandescent lamp bulbs. The correct bulb temperature of the iodine-containing lamp can then be controlled, in part, by employing higher pressures of a gas such as nitrogen in the outer bulb to provide increased cooling.

The evacuation and filling of the lamp may be performed by sealing an unexhausted lamp on a quartz vacuum system to which is attached a side trap containing crystalline iodine. The lamp is then evacuated and baked out, and the filament is then lighted to degas it. For a vacuum lamp it is then tipped off beyond the trap, leaving the iodine trap attached to the bulb. For gas filled lamps, argon or other gas is admitted before tipping off. The iodine trap is ultimately tipped-off from the lamp after the iodine has been introduced into the lamp either by manipulating the lamp and attached trap to introduce a small crystal into the lamp or by distilling the vapor of the iodine into the lamp.

While we have illustrated and described certain embodiments of our invention, it will be obvious to those skilled in the art that various changes and modifications may be made without departing from the true spirit and scope of the invention as defined in the appended claims.

The present application is a continuation-in-part of our application Serial No. 526,271, filed August 8, 1955, now abandoned.

What we claim as new and desire to secure by Letters Patent of the United States is:

1. A compact high efficiency electric incandescent lamp comprising, in combination, a substantially tubular light-transmitting envelope, an incandescible filament of coiled tungsten wire having a linear axis substantially coincident with the axis of said envelope and extending virtually the full length of the interior of said envelope, lead-in conductors sealed through opposite ends of said envelope and connected to the respective ends of said filament, said lead-in conductors being of refractory metal of the group consisting of tungsten, molybdenum and platinum, a filling in said envelope of inert gas, said filament incandescing and being subject to partial vaporization at a temperature in excess of about 2500° C., said envelope surrounding and forming a condensing interior wall for collecting vaporized particles of said filament and being close enough to said filament so that said interior wall of the envelope is heated to a substantially uniform temperature in the range of 250–1200° C. upon incandescence of said filament, and a quantity of iodine in said envelope less than that which results in appreciable absorption of light by the iodine vapor in the envelope but sufficient to effect a regenerative getter action whereby the iodine combines chemically with the vaporized tungsten particles on said heated interior wall to form essentially the compound tungsten iodide and thereby remove particles from said wall, and said compound is decomposed by heat in the vicinity of said filament to redeposit tungsten particles on said filament.

2. A lamp as set forth in claim 1, wherein the iodine in the envelope is in an amount of about .01 to 1 micromole per cubic centimeter of envelope volume.

3. A lamp as set forth in claim 1, wherein the envelope diameter is not greater than about one-half inch and the tungsten filament has a resistance such as to consume in excess of 100 watts per inch of length.

4. A lamp as set forth in claim 1, wherein the envelope diameter is not greater than about one-half inch, the tungsten filament has a resistance such as to consume in excess of 100 watts per inch of length, and the gas filling consists of a gas from the group consisting of argon, krypton and xenon and mixtures thereof.

5. A lamp as set forth in claim 1, wherein the envelope diameter is not greater than about one-half inch, the tungsten filament has a resistance such as to consume in excess of 100 watts per inch of length, and the portions of the lead-in conductors in the interior of the envelope consist of tungsten.

6. A lamp as set forth in claim 1, wherein the envelope diameter is not greater than about one-half inch, the tungsten filament has a resistance such as to consume in excess of 100 watts per inch of length, the gas filling consists of a gas from the group consisting of argon, krypton and xenon and mixtures thereof, and the portions of the lead-in conductors in the interior of the envelope consist of tungsten.

References Cited in the file of this patent
UNITED STATES PATENTS 1,267,888      Meikle _____ May 28, 1918